No. 663,477. Patented Dec. 11, 1900.
J. C. STOCKS.
MUSICAL NOTE BUILDING BLOCKS.
(Application filed Aug. 29, 1900.)
(No Model.)

Witnesses. Inventor.
Jean C. Stocks.
by
Fetherstonhaugh & Co
Attys.

UNITED STATES PATENT OFFICE.

JEAN CHALMERS STOCKS, OF TORONTO, CANADA.

MUSICAL-NOTE BUILDING-BLOCKS.

SPECIFICATION forming part of Letters Patent No. 663,477, dated December 11, 1900.

Application filed August 29, 1900. Serial No. 28,436. (No model.)

*To all whom it may concern:*

Be it known that I, JEAN CHALMERS STOCKS, of the city of Toronto, in the county of York, in the Province of Ontario, Canada, have invented certain new and useful Improvements in Musical-Note Building-Block Games, of which the following is a specification.

My invention relates to improvements in musical-note building-block games; and the object of the invention is to devise an arrangement of blocks whereby by the separation of same the various half-notes or minims, quarter-notes or crochets, and eighth-notes or quavers, &c., may be separated from the one cubical group of blocks in regular order, and thereby instil into the young the respective values of the notes used in music; and it consists, essentially, of a group of eight cubical blocks formed into a large cube, the whole note being represented on the top of the large cube equally on the upper faces of the four and at the adjacent angles and the minim, crochet, and quaver being represented on the different blocks comprising the large cube when separated, as hereinafter more particularly explained.

Figure 1:
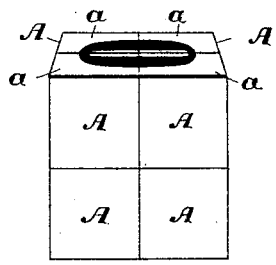
Figure 2:
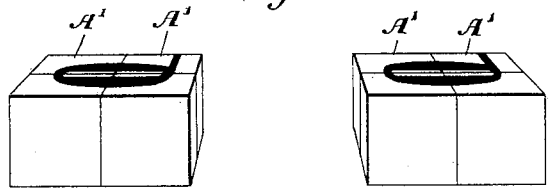
Figure 3:
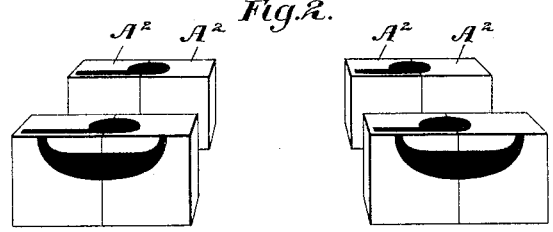
Figure 4:
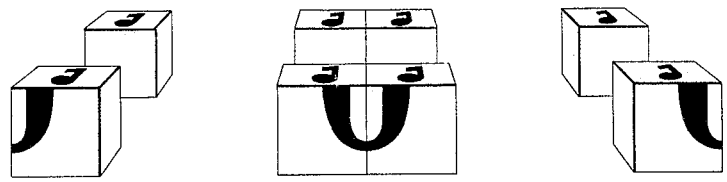

Figure 1 is a view of the cubes placed together as one large cube, showing the whole note at the top. Fig. 2 is a view showing them separated from the central division, Fig. 1, and turned laterally outwardly, showing the minims at the top. Fig. 3 is a view of the blocks shown in Fig. 2, with the two forward blocks at each side turned forwardly and the two rearwardly to the adjacent side showing the crochet notes or quarters at the top. Fig. 4 is a view of the sets of blocks shown in Fig. 3, showing the inner blocks in said figure turned over once inwardly and the outer block turned over once outwardly and exhibiting on the tops of each of the blocks the quavers.

In the drawings like letters of reference indicate corresponding parts in each figure.

A A A A A A A A are the eight blocks comprising the cube. On the face $a$ at the top and at the adjacent angles of the faces is formed the whole note, as indicated. By turning over the blocks, as shown in Fig. 2, the minims are shown on the faces $A'$ $A'$ of each set of four blocks and at the adjacent angles of the blocks, thus showing that two minims are equal to one whole note or two parts are equal to the whole. In Fig. 3 the crochets are shown partly on the faces $A^2$ $A^2$ of each of the four sets of blocks of two, showing that it takes four crochets to make two minims or one whole note. In Fig. 4 the quavers are shown on the faces $A^3$ $A^3$ of the eight blocks, showing that it takes eight blocks or eight one-eighths to equal four quarters, two halves, or one whole note. By putting these blocks together again in exactly the reverse method it demonstrates the value of my musical-note building-blocks, as it impresses upon the mind the respective values of the notes. Of course similar blocks might be still further subdivided, and in such case to avoid confusion I would preferably connect the blocks when further divided by pins, which it is not necessary here to describe or show, except that the pins would extend through the centers of the connected blocks; but the same idea may be carried out without departing from the spirit of my invention. I may, however, mention that each face or set of faces upon which a note appears in order to more readily insure the notes being put together properly must be colored correspondingly. For instance, in Fig. 1 the faces $a$, upon which the whole note appears, may be colored red, in Fig. 2 the faces $A'$ may be colored orange, in Fig. 3 the faces $A^2$ may be colored yellow, and in Fig. 4 the faces $A^3$ may be colored green.

What I claim as my invention is—

1. In combination, a series of blocks adapted to be placed together to form a unit, a number of said blocks having a part of a character indicated on one of their faces which will present, when the blocks are assembled to form a whole or a unit, a unit character, said blocks also having indited on their faces characters and parts of characters which will denote divisions of said unit character when the blocks are separated or assembled in groups corresponding to the divisions the blocks or groups of blocks bear to the whole unit, substantially as described.

2. In combination, a series of blocks comprising eight members adapted to form a cube when placed together, four of said blocks having on one of their faces one-quarter of a full note indited, whereby when placed together a full note will be presented to view, each of said blocks having one-fourth of a half-note on one of its faces whereby when said blocks are grouped in two parts and placed together two half-notes will be presented to view, each of said blocks having on one of its faces one-half of a quarter-note whereby when placed in pairs four quarter-notes may be presented and each of said blocks having a whole eighth-note indited on one of its faces whereby when separated eight quarter-notes may be presented, substantially as described.

JEAN CHALMERS STOCKS.

Witnesses:
B. BOYD,
H. DENNISON.